US006598091B1

United States Patent
Yoo et al.

(10) Patent No.: US 6,598,091 B1
(45) Date of Patent: Jul. 22, 2003

(54) METHOD AND MEDIUM FOR RENDERING DOCUMENTS BY SERVER

(75) Inventors: Jin Hee Yoo, Seoul (KR); Won Bong Cho, Kyungki-do (KR); Min Seop Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/347,235

(22) Filed: Jul. 2, 1999

(30) Foreign Application Priority Data

Oct. 12, 1998 (KR) ........................................ 1998-42551
Jun. 10, 1999 (KR) ........................................ 1999-21607

(51) Int. Cl.⁷ ................................................. G06F 9/44
(52) U.S. Cl. ........................ 709/246; 715/513; 715/523
(58) Field of Search ................................. 709/217, 219, 709/203, 226, 223, 246, 206; 707/10, 101; 715/513, 523

(56) References Cited

U.S. PATENT DOCUMENTS

| | | | |
|---|---|---|---|
| 5,727,159 A | * 3/1998 | Kikinis | 709/206 |
| 5,768,515 A | 6/1998 | Choquier et al. | 395/200.36 |
| 5,784,058 A | 7/1998 | LaStrange et al. | 345/340 |
| 5,845,084 A | 12/1998 | Cordell et al. | 395/200.64 |
| 5,847,708 A | 12/1998 | Wolff | 345/349 |
| 5,848,415 A | * 12/1998 | Guck | 707/10 |
| 5,911,776 A | * 6/1999 | Guck | 709/217 |
| 6,157,924 A | * 12/2000 | Austin | 707/10 |
| 6,212,550 B1 | * 4/2001 | Segur | 709/206 |

* cited by examiner

Primary Examiner—Dung C. Dinh
Assistant Examiner—Kimberly Flynn
(74) Attorney, Agent, or Firm—Sughrue Mion, PLLC

(57) ABSTRACT

A method and a medium for rendering documents to a browser from a server are provided. According to the rendering method, the browser requests a predetermined document and at the same time transmits user's computing environmental information to the server. The server evaluates the computing environmental information received from the browser. The server converts the requested document based on the evaluated user's computing environmental information. The server transmits the converted document to the browser. The server renders the documents to the browser in an appropriate manner by including only the information accessible in compliance to the user's computing environmental information, or converting it into the document accessible by the user. Thus, the data volume to be processed by the browser as well as the network traffic are reduced, and thus the document transfer rate is enhanced. In addition, the user having a limited computing environment can sufficiently utilize the documents.

17 Claims, 2 Drawing Sheets

METHOD AND MEDIUM FOR RENDERING DOCUMENTS BY SERVER

BACKGROUND OF THE INVENTION

1. Technical Field

The present invention relates to a method and a medium for rendering a document written into hypertext markup language (HTML), and more particularly, to a method and a medium for rendering an HTML document to a web browser in which a web server properly converts the HTML document according to a user's computing environment and renders the converted result to the web browser.

2. Prior Art

Generally, the Internet is a kind of computer network, that is, a world-wide network of computers or servers for sharing information about education, economy, trade, etc. Computers connected to the Internet use TCP/IP (Transmission Control Protocol/Internet Protocol) as a standard protocol to communicate with one another, or any other networks. The TCP/IP divides the information obtained via the Internet into smaller pieces called packets. These packets are each numbered and are labelled with destination addresses, so as to be forwarded to the destination. That is, the packets are stamped with information concerning where the packets are from, where they go, and how many packets there are in total, and then are sent to the designation. After the packets arrive at the destination, they are reassembled.

These days WWW (World Wide Web: hereinbelow referred to as "The Web") is the most popular information service provider on the Internet, and allows graphic information and sound information as well as text information to be presented and exchanged.

One of the significant features of the Web is providing information in the form of "hypertext" or "hypermedia". The term "hypertext" means text information that includes links connected to other online information therein and the term "hypermedia" extends the concept of hypertext to other forms of information, including images, sounds and even motion images. Therefore, a user reading a hypermedia document clicks one of the links embedded in the document on the screen so as to receive a new document in a desired web site specified by URL (Universal Resource Locator).

The Web also adopts a client-server system as other internet services do, but differs from the conventional client-server applications, where a connection between the client and the server is maintained as long as the client is active. A web client (hereinafter referred to as a "web browser") and a web server are kinds of application programs, and exchange data through a standard protocol. HTTP (HyperText Transfer Protocol), one of the standard protocols, is used to communicate web documents of hypertext- and hypermedia-structures between web clients and web servers. Web documents are created using HTML and are generally ASCII texts with tags. Tags are commands inserted in the texts to present texts on a monitor screen or jump to other web documents.

FIG. 1 is a block diagram illustrating a transmission path between a web browser and a web server. A web browser 110 initiates a request for a HTML document resident in a web site specified by URL. to a web server 120. The web server 120 then obtains, and supplies the web browser 110 with, the desired HTML data. The web browser 110 displays the supplied document on user's display devices in an appropriate format.

Here, the HTML documents in a site specified by URL, provided to the web browser 110 by the web server 120 are transmitted without any modification, taking no consideration of users' various computing environments, that is, irrespectively of whether or not the user's computer is equipped with a mouse, a speaker or a keyboard.

However, when a user is under a limited computing environment; for example, when a user has a computer system having no speaker, the user cannot listen to the phonetical information included in the HTML documents.

Therefore, the information contained in the HTML document supplied by a web server 120 would be useless to a user if the user cannot gain access thereto due to a limited computing environment, which causes a mere waste in data transmission time and an increase in the amount of web traffic because of the transmission of the data unavailable.

SUMMARY OF THE INVENTION

It is thus an object of the invention to provide a method and a medium for rendering a document to a browser of a user, according to user's computing environments.

The object of the present invention can be accomplished by providing a method for rendering a document to a browser by a server, the document rendering method comprising the steps of: the browser requesting a predetermined document to the server and at the same time transmitting user's computing environmental information to the server; the server evaluating the user's computing environmental information received from the browser; the server converting the requested document according to the evaluated user's computing environmental information; and the server transmitting the converted document to the browser.

It is preferable that the computing environmental information is included in a HTTP header.

It is preferable that the method further includes the step of making an appointment for communicating the user's computing environmental information between the server and the browser.

It is more preferable that the method further includes the steps of: the server requesting user's computing environmental information to a new browser, in the case that the new browser makes no appointment with the server for communicating user computing environmental information with each other; and the browser transmitting the user's computing environmental information to the server based on the request.

The method is effective when it further includes the steps of: the browser displaying a fill-in form for requesting a user to fill the user's computing environmental information therein when the server requests the user's computing environmental information; and the server transmitting the computing environmental information filled in by the user to the server.

The object of the present invention can also be accomplished by providing a computer readable medium for rendering a document to a browser by a server on a computer network, the computer readable medium comprising: program code means for requesting a predetermined document and at the same time transmitting user's computing environmental information to said server, at said browser; program code means for evaluating the computing environmental information received from said browser, at said server; program code means for converting said requested document according to the evaluated user's computing environmental information, at said server; and program code means for transmitting said converted document to said browser, at said server.

It is preferable that the computing environmental information is included in a hypertext transfer protocol (HTTP) header.

BRIEF DESCRIPTION OF THE DRAWINGS

The above object of the present invention will become more apparent by describing in detail the preferred embodiment of the present invention with reference to the attached drawings in which.

DETAILED DESCRIPTION OF THE PREFERRED EMBODIMENT

The preferred embodiment will be described in detail with reference to the accompanying drawings.

Figure 1:
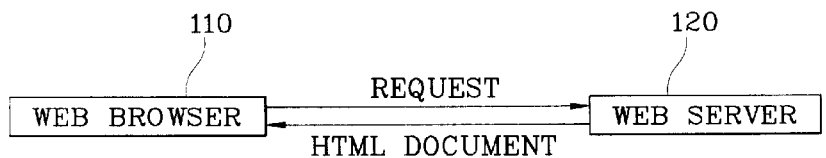
FIG. 1 is a block diagram illustrating a transmission path between a web browser and a web server.
Figure 2:
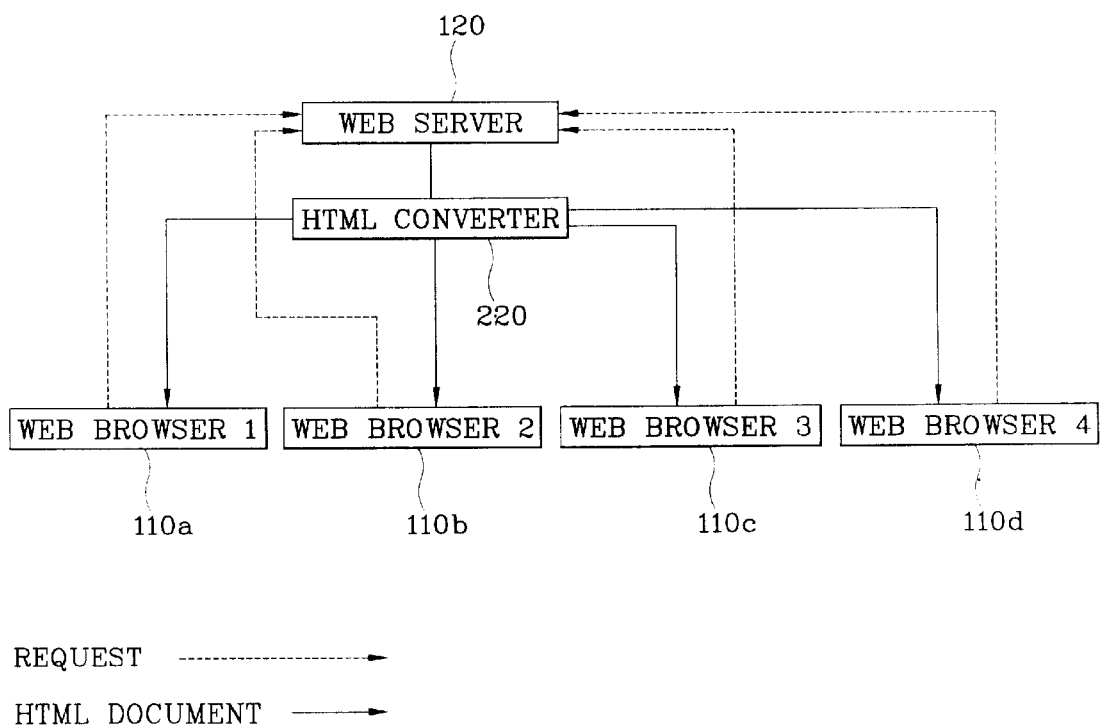
FIG. 2 is a schematic view of the method for rendering web documents according to the present invention.

FIG. 2 is a schematic view illustrating a method for rendering web documents according to the present invention. The system for rendering the web documents includes web browsers 110a, 110b, 110c and 110d, a web server 120, and a HTML converter 220.

The term "HTTP" is a web standard protocol for exchanging HTML documents between the web server 120 and the web browsers 110a, 110b, 110c and 110d. Information transmitted by the HTTP is comprised of a HTTP header and a documents body. The HTTP header is transferred by MIME (Multi-purpose Internet Mail Extensions) which is an internet standard protocol for multi-media electronic mails on the internet. The HTTP has two advantages by using the MIME protocol: first, it can transmit ASCII data and second, it can serve to identify the type of data during transmission. Thus, the HTTP header can convey the method for opening HTML documents and the information for identifying formats of HTML documents, as well as the binary information, and also convey even the (encoded) nonstandard information agreed between the web server 120 and the web browsers 110a, 110b, 110c and 110d. Generally, the HTTP header contains information about the version of HTTP utilized, the status of response, the current date and time, and the information linked to the requested document such as its length and the last time it was modified, and a documents body indicates the requested HTML documents.

A plurality of web browsers 110a, 110b, 110c and 110d respectively gain access to a web server and send a GET request with a URL (Uniform Resource Locator) of desired HTML documents to the web server according to the protocols specified in the URL. The URL provides a standard information location indicating method for identifying the location of millions of web documents on the Internet in a uniform manner, and is used to indicate the location of web documents contained in the web servers.

When sending a GET request, on the basis of a predetermined encoding/decoding method, a web browser writes a user's computing environmental information on a HTTP header, e. g., whether the user's computer has a color or a mono display, the mode of the display is in texts or in graphics, the computer system is equipped with a keyboard, a speaker/microphone, a Windows environment, a monitor, etc., and then transmits such information to the web server 120.

The web server 120 requested by a web browser to render HTML documents evaluates the user's computing environmental information from the HTTP header, and then, deletes tags or contents unnecessary for the user from the fetched HTML documents specified by URL, using a HTML converter 220, on the basis of the evaluated user's computing environment information, or converts the fetched HTML documents into documents in the form of which the user can access thereto.

For example, in a computing environment having no mouse, the web server 120 inserts tab indices in the links or the image maps on HTML documents such that a user can access thereto via a keyboard. When a "FORM" for inputting keywords to search for information is contained in the requested HTML document, the web server 120 can insert an access key for the user to fill in the FORM by using the keyboard and moving the curse, within the FORM. In a computing environment without having both a mouse and a keyboard but with a speaker, the web server 120 converts the content of the HTML documents into the phonetical information, in which case the server 120 inserts a word or a number in front of, or at the back of, an anchor or an image map or makes the sound of an anchor louder so that the user can recognize the anchor or the image map simply by listening the sound. In a computing environment having no monitor, an original text file is converted into an audio file such that a file content can be recognized. In a computing environment without having a GUI (Graphic User Interface), the web server 120 renders a title or a URL in the place of an image to indicate that an image exists.

The web server 120 transmits the HTML web documents converted in accordance with the user's computing environment to the web browsers 110a, 110b, 110c and 110d in order to display them on a screen according to the type of the HTML documents.

Figure 3:
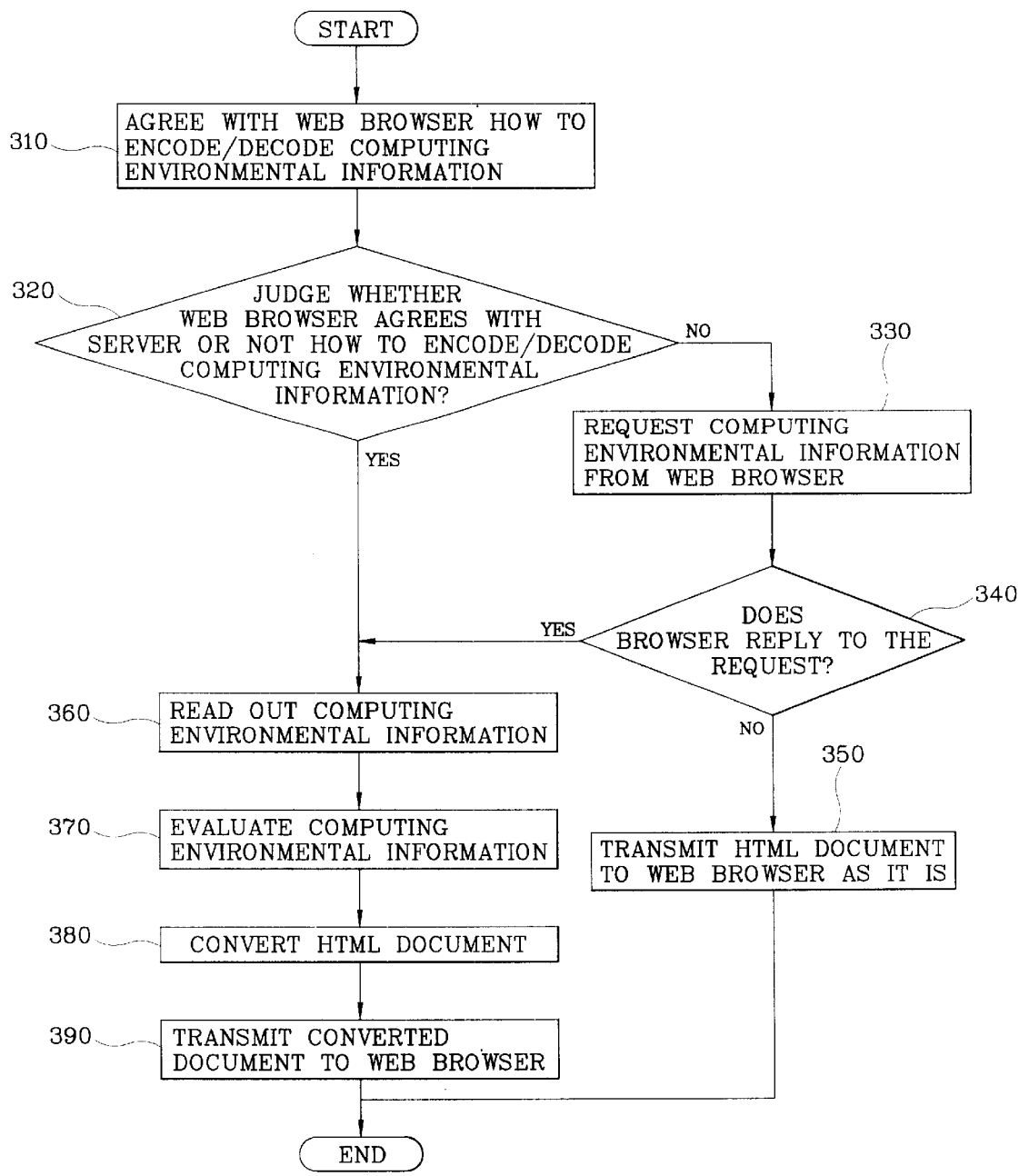
FIG. 3 is a flow chart view showing the method for rendering the HTML documents by the web server, according to the user's computing environments.

FIG. 3 is a flow chart showing the method of rendering the HTML document by the web server, according to the user's computing environment.

The web server 120 and said web browsers 110a, 110b, 110c and 110b agree how to encode and decode the user's computing environmental information (step 310). For example, information as to whether the computer is equipped with a speaker, what is the color of the monitor, etc., is converted into ASCII data which correspond to each other in an one-to-one basis, in order to be recognized by each other. When the web server 120 is requested by the web browsers 110a, 110b, 110c and 110d to render a document, it first judges whether the request was made from the web browser containing the agreed user's computing environment information (step 320). If it is confirmed, the web server 120 reads out the user's computing environmental information contained in the HTTP header from the HTTP protocol transmitted from the web browsers 110a, 110b, 110c and 110d (step 360).

If the browser does not contain the user's computing environmental information in the HTTP header, the web server 120 first requests the web browsers 110a, 110b, 110c and 110d to render the user's computing environmental information.

When the web server 120 requests the user's computing environmental information and at the same time sends the page including a FORM to the web browsers 110a, 110b, 110c and 110d. Then, the web browsers receive and display it on the display device, so that the user can input his computing environmental information therein. For this purpose, the user's computer system must be equipped with a display device and a means for inputting his or her computing environmental information such as a keyboard or a mouse. A user fills in the page transmitted from the web server 120 and then sends the filled-in page back to the web server 120. The page with a FORM requesting user's computing environmental information may have several items concerning the user's computing environmental information which are prearranged by the web server 120 so that the user can mark on the appropriate items by clicking on them. Otherwise, the user may directly input his or her computing environmental information on the FORM. By leaving the FORM blank, the user may not transmit his or her computing environmental information to the web server, in which case the web server 120 renders the HTML documents without any modification as they are.

Where the user's computing environmental information is sent to the web server 120, loaded in the HTTP header or through the page with a FORM requesting the user to input the information, the web server 120 reads out the users computing environmental information (step 360) and evaluates it (step 370), and converts the HTML documents specified in the URL to comply with the evaluated user's computing environmental information through HTML converter (step 380). The HTML documents converted by the web server 120 is transmitted to the web browsers 110a, 110b, 110c and 110d through the HTTP protocol (step 390).

As described above according to the present invention, the web server renders the HTML documents to the web browser in an appropriate manner by including only the information accessible in compliance to the user's computing environment, or converting it into the document accessible by the user. Thus, the network traffic as well as the data volume to be processed by the web browser are reduced, and thus the document transfer rate is enhanced. In addition, the user having a limited computing environment can sufficiently utilize the web documents.

It is expected that portable communications devices will be provided in various developed patterns as use of lap-top or palm-top computers is prevailing and user's computing environments will also be varied accordingly. Thus, the method and the medium for rendering HTML documents converted by a web server according to the present invention will be more effective in various computing environments as described above.

Although the present invention has been described in connection with preferred embodiment thereof, it will be appreciated by those skilled in the art that additions, modifications, substitutions and deletions not specifically described may be made without departing from the spirit and scope of the invention as defined in the appended claims.

What is claimed is:

1. A method for rendering a document to a browser by a server on a computer network, the method comprising the steps of:

at said browser, simultaneously requesting a predetermined document from said server and transmitting computing environmental information of a user to said server;

at said server, evaluating the computing environmental information received from said browser;

at said server, converting said requested document according to the evaluated computing environmental information;

at said server, transmitting said converted document to said browser and further comprising agreeing how to receive and transmit the computing environmental information between said browser and said server;

at said server, requesting said computing environmental information from a browser, if a document request is sent from the browser which has not agreed with said server as to how to receive and transmit the computing environmental information; and at said browser, transmitting the computing environmental information to said server based on the requesting.

2. The method of claim 1, wherein said computing environmental information is included in a hypertext transfer protocol (HTTP) header.

3. The method of claim 1, wherein said requesting step comprises the steps of:

transmitting a FORM embedded page to said browser for requesting a user to fill in the FORM embedded page;

displaying the FORM embedded page on a display; and transmitting said computing environmental information to said server.

4. The method of claim 1, further comprising positioning said browser in a portable communication device.

5. The method of claim 1, further comprising generating said computing environmental information by determining whether a computing environment of said user includes at least one of an audio interface, a video interface, an alphanumeric interface and a mouse interface.

6. The method of claim 5, wherein said converted document is converted to a format for said audio interface if said computing environment does not include at least one of said video interface, said alphanumeric interface and said mouse interface, and said converted document is converted to a format for said video interface if said computing environment does not include said audio interface.

7. A computer readable medium for rendering a document to a browser by a server on a computer network, the computer readable medium comprising:

program code means for simultaneously requesting a predetermined document from said server and transmitting computing environmental information of a user to said server, at said browser;

program code means for evaluating the computing environmental information received from said browser, at said server;

program code means for converting said requested document according to the evaluated computing environmental information, at said server; and program code means for transmitting said converted document to said browser, at said server, wherein said computing environmental information is generated by determining whether a computing environment of said user includes at least one of an audio interface, a video interface, an alphanumeric interface and a mouse interface.

8. The computer readable medium of claim 7, wherein said computing environmental information is included in a hypertext transfer protocol (HTTP) header.

9. The computer readable medium of claim 7, wherein said browser is located in a portable communication device.

10. The computer readable medium of claim 7, wherein said converted document is converted to a format for said audio interface if said computing environment does not include at least one of said video interface, said alphanumeric interface and said mouse interface, and said converted document is converted to a format for said video interface if said computing environment does not include said audio interface.

11. A method for rendering a document to a browser by a server on a computer network, the method comprising the steps of:
- at said browser, simultaneously requesting a predetermined document from said server and transmitting computing environmental information of a user to said server;
- at said server, evaluating the computing environmental information received from said browser;
- at said server, converting said requested document according to the evaluated computing environmental information;
- at said server, transmitting said converted document to said browser; and
- generating said computing environmental information by determining whether a computing environment of said user includes at least one of an audio interface, a video interface, an alphanumeric interface and a mouse interface.

12. The method of claim 11, wherein said computing environmental information is included in a hypertext transfer protocol (HTTP) header.

13. The method of claim 11, further comprising the step of agreeing how to receive and transmit the computing environmental information between said browser and said server.

14. The method of claim 13, further comprising the steps of:
- at said server, requesting said computing environmental information from a browser, if a document request is sent from the browser which has not agreed with said server as to how to receive and transmit the computing environmental information; and
- at said browser, transmitting the computing environmental information to said server based on the requesting.

15. The method of claim 14, wherein said requesting step comprises the steps of:
- transmitting a FORM embedded page to said browser for requesting a user to fill in the FORM embedded page;
- displaying the FORM embedded page on a display; and
- transmitting said computing environmental information to said server.

16. The method of claim 11, further comprising positioning said browser in a portable communication device.

17. The method of claim 11, wherein said converted document is converted to a format for said audio interface if said computing environment does not include at least one of said video interface, said alphanumeric interface and said mouse interface, and said converted document is converted to a format for said video interface if said computing environment does not include said audio interface.

* * * * *